(12) United States Patent
Fan

(10) Patent No.: US 9,334,871 B2
(45) Date of Patent: May 10, 2016

(54) FAN ROTATION SPEED ADJUSTING SYSTEM

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventor: Yong-Chang Fan, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 14 days.

(21) Appl. No.: 14/529,451

(22) Filed: Oct. 31, 2014

(65) Prior Publication Data
US 2015/0184667 A1 Jul. 2, 2015

(30) Foreign Application Priority Data
Dec. 26, 2013 (CN) .......................... 2013 1 0729997

(51) Int. Cl.
G05B 5/00 (2006.01)
F04D 27/00 (2006.01)

(52) U.S. Cl.
CPC .................................. *F04D 27/004* (2013.01)

(58) Field of Classification Search
CPC ....... G03B 21/16; H05B 33/0854; G06F 1/26
See application file for complete search history.

(56) References Cited

U.S. PATENT DOCUMENTS

2012/0194117 A1* 8/2012 Huang .................. F04D 27/004
318/472

* cited by examiner

*Primary Examiner* — Karen Masih
(74) *Attorney, Agent, or Firm* — Novak Druce Connolly Bove + Quigg LLP

(57) ABSTRACT

A fan rotational speed adjusting system includes a power supply unit, a fan, a current detecting circuit and a temperature detecting circuit. The current detecting circuit detects a first DC voltage from the power supply unit, compares the first DC voltage with a first reference voltage, and outputs a first adjusting voltage. The temperature detecting circuit detects a temperature change of the power supply unit, and outputs a second adjusting voltage. The temperature detecting circuit receives the first adjusting voltage, compares the first adjusting voltage and the second adjusting voltage with a second reference voltage, and outputs a third DC voltage to the fan. The fan rotates in the corresponding rotational speed, and dissipates heat for the power supply unit.

16 Claims, 2 Drawing Sheets

FAN ROTATION SPEED ADJUSTING SYSTEM

CROSS-REFERENCE TO RELATED APPLICATIONS

This application claims priority to Chinese Patent Application No. 201310729997.X filed on Dec. 26, 2013, the contents of which are incorporated by reference herein.

FIELD

The subject matter herein generally relates to a fan rotational speed adjusting system.

BACKGROUND

Using pulse-width modulation (PWM) to control the rotation speed of a cooling fan is an established method for reducing the cost of a variable speed fan in a cooling system. PWM signals can vary the operating speeds of the cooling fan since the rotation speed of the fan is determined by the duty cycle. For example, a PWM signal having a duty cycle of 100 percent makes the fan run at maximum. Whereas, a PWM signal having a duty cycle of 50 percent makes the fan run at a rate approximately half speed.

BRIEF DESCRIPTION OF THE DRAWINGS

Implementations of the present technology will now be described, by way of example only, with reference to the attached figures.

DETAILED DESCRIPTION

Figure 1:
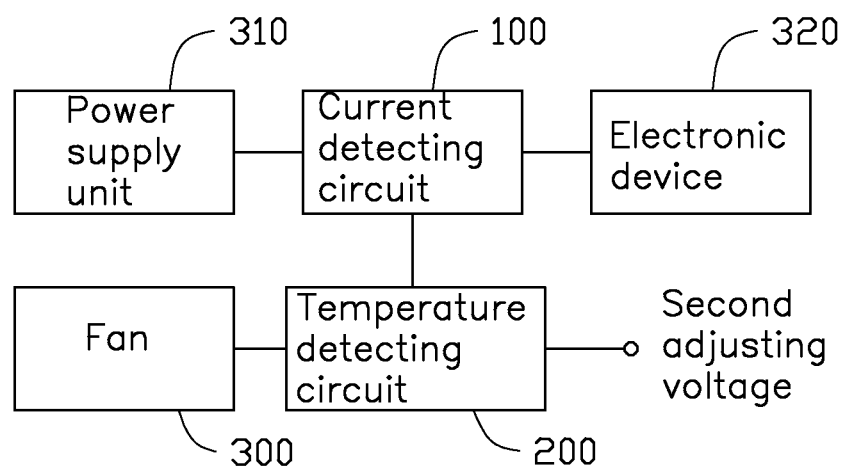
FIG. 1 is a block diagram of an embodiment of a fan rotational speed adjusting system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates a fan rotational speed adjusting system for a fan 300 in accordance with an embodiment. The fan rotational speed adjusting system includes a current detecting circuit 100 and a temperature detecting circuit 200. The fan 300 is configured to dissipate heat for a power supply unit 310. The power supply unit 310 is configured to provide a first DC voltage to an electronic device 320.

Figure 2:
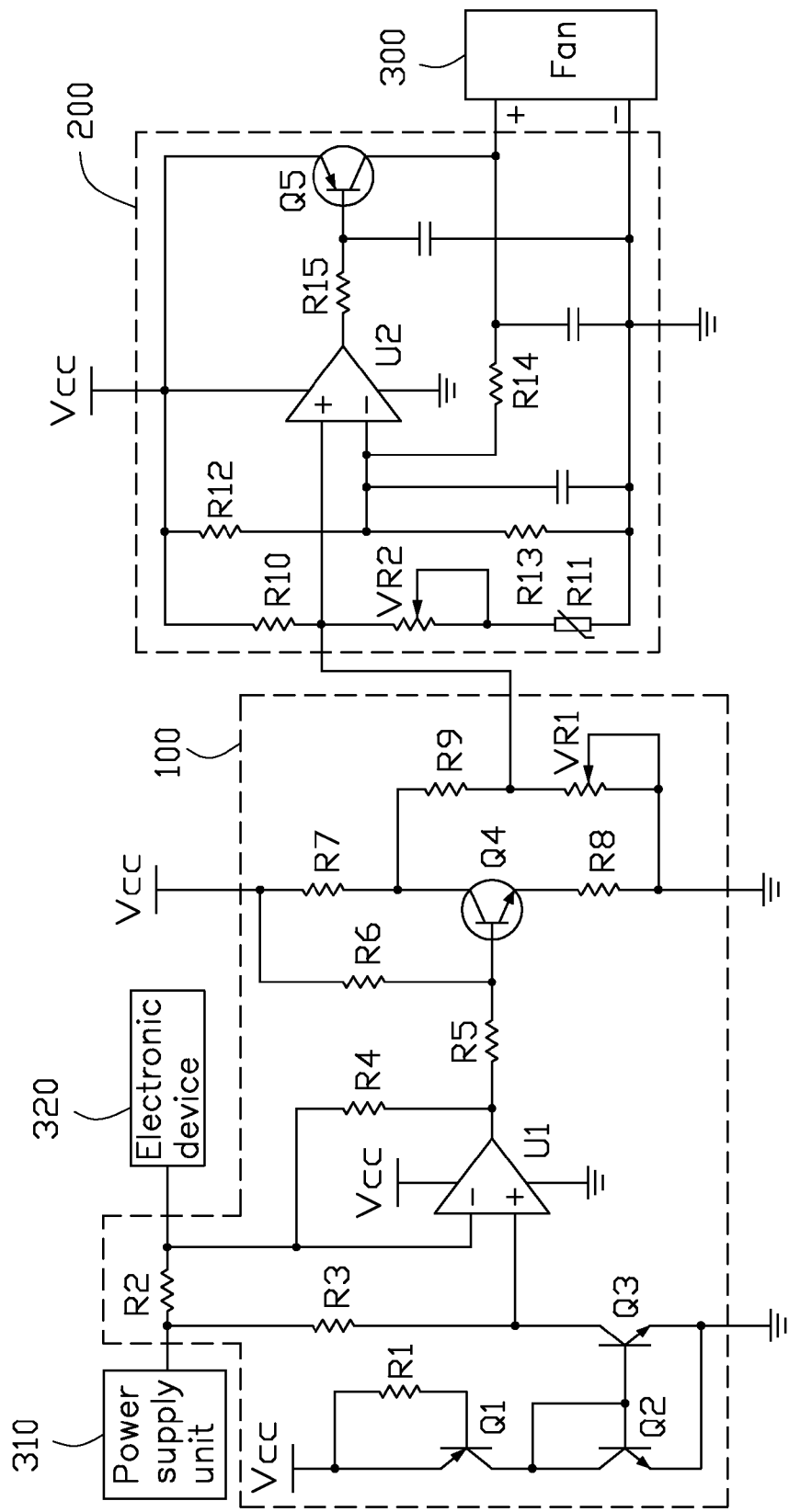
FIG. 2 is a circuit diagram of the fan rotational speed adjusting system of FIG. 1.

FIG. 2 illustrates the current detecting circuit 100 includes a first transistor Q1, a second transistor Q2, a third transistor Q3, a fourth transistor Q4, a first comparator U1, a number of resistors R1-R9, and a first variable resistor VR1. The first comparator U1 includes a non-inverting input terminal, an inverting input terminal, and an output terminal. The first variable resistor VR1 includes a first terminal, a second terminal, and an adjusting terminal. The resistor R2 is electrically coupled to the power supply unit 310 and the electronic device 320 in series.

A base of the first transistor Q1 is electrically coupled to an emitter of the first transistor Q1 via the resistor R1. The emitter of the first transistor Q1 is configured to receive a second DC voltage. A collector of the first transistor Q1 is electrically coupled to a base of the second transistor Q2 and a base of the third transistor Q3. The base of the second transistor Q2 is electrically coupled to a collector of the second transistor Q2. An emitter of the second transistor Q2 and an emitter of the third transistor Q3 are grounded. A collector of the third transistor Q3 is electrically coupled to a connecting point between the power supply unit 310 and the resistor R2 via the resistor R3.

The non-inverting input terminal of the first comparator U1 is electrically coupled to the collector of the third transistor Q3. The inverting input terminal of the first comparator U1 is electrically coupled to a connecting point between the resistor R2 and the electronic device 320. The inverting input terminal of the first comparator U1 is electrically coupled to the output terminal of the first comparator U1 via the resistor R4. A connecting point between the output terminal of the first comparator U1 and the resistor R4 is electrically coupled to a base of the fourth transistor Q4 via the resistor R5.

A connecting point between the base of the fourth transistor Q4 and the resistor R5 is configured to receive the second DC voltage via the resistor R6. A collector of the fourth transistor Q4 is configured to receive the second DC voltage via the resistor R7. The collector of the fourth transistor Q4 is electrically coupled to the first terminal of the first variable resistor VR1 via the resistor R9. The second terminal and the adjusting terminal of the first variable resistor VR1 are grounded. An emitter of the fourth transistor Q4 is grounded via the resistor R8. In at least one embodiment, the first transistor Q1 is a PNP type transistor. The second transistor Q2, the third transistor Q3, and the fourth transistor Q4 are NPN type transistors.

The temperature detecting circuit 200 includes a second comparator U2, a fifth transistor Q5, a number of resistors R10-R15, and a second variable resistor VR2. The second comparator U2 includes a non-inverting input terminal, an inverting input terminal, and an output terminal. The second variable resistor VR2 includes a first terminal, a second terminal, and an adjusting terminal. The fan 300 includes an anode and a cathode.

The non-inverting input terminal of the second comparator U2 is electrically coupled to the first terminal of the first variable resistor VR1. The non-inverting input terminal of the second comparator U2 is configured to receive the second DC voltage via the resistor R10. The non-inverting input terminal of the second comparator U2 is electrically coupled to the first terminal of the second variable resistor VR2. The second terminal and the adjusting terminal of the second variable resistor VR2 are electrically connected and grounded via the resistor R11. The inverting input terminal of the second comparator U2 is configured to receive the second DC voltage via the resistor R12.

The inverting input terminal of the second comparator U2 is grounded via the resistor R13. The inverting input terminal of the second comparator U2 is electrically coupled to the anode of the fan 300 via the resistor R14. The cathode of the fan 300 is grounded. The output terminal of the second comparator U2 is electrically coupled to a base of the fifth transistor Q5 via the resistor R15. An emitter of the fifth transistor Q5 is configured to receive the second DC voltage. A collector of the fifth transistor Q5 is electrically coupled to the anode of the fan 300. In at least one embodiment, the fifth transistor Q5 is a PNP type transistor. The resistor R11 is a Negative Temperature Coefficient thermal resistor.

In use, when the first DC voltage from the power supply unit 310 varies, a current flows through the resistor R2 is changed, and a potential difference is generated on the resistor R2. The inverting input terminal of the second comparator U2 detects the potential difference. The second DC voltage generates a voltage difference between the base and the emitter of the first transistor Q1 via the resistor R1. The first transistor Q1 turns on. The base of the second transistor Q2 and the base of the third transistor Q3 receive the second DC voltage. The second transistor Q2 and the third transistor Q3 turn on. The first transistor Q1, the second transistor Q2, and the third transistor Q3 generate a constant current on the resistor R3. The constant current generates a constant first reference voltage on the non-inverting input terminal of the first comparator U1.

The first comparator U1 compares the potential difference with the first reference voltage, and outputs a high voltage level control signal at the output terminal. The control signal generates a base current on the base of the fourth transistor Q4 via the resistor R5. The fourth transistor Q4 receives the high voltage level control signal. The fourth transistor Q4 turns on. The fourth transistor Q4 amplifies the base current and outputs a collector current on the collector of the fourth transistor Q4. The collector current flows through the resistor R7. A voltage on the resistor R7 is increased. A voltage on the resistor R9 and the first variable resistor VR1 by the second DC voltage is decreased. The collector of the fourth transistor Q4 outputs a first adjusting voltage to the non-inverting input terminal of the second comparator U2 via the resistor R9.

The thermal resistor R11 detects a temperature change of the power supply unit 310. A resistance of the thermal resistor R11 is decreased as a temperature of the power supply unit 310 increases. A voltage on the second variable resistor VR2 and the resistor R11 by the second DC voltage is decreased. A connecting point between the resistor R10 and the second variable resistor VR2 outputs a second adjusting voltage to the non-inverting input terminal of the second comparator U2. The second DC voltage generates a second reference voltage on the inverting input terminal of the second comparator U2 by the resistors R12 and R13.

The second comparator U2 compares the first adjusting voltage and the second adjusting voltage with the second reference voltage, and outputs a low voltage level driving signal. The driving signal generates a base current on the base of the fifth transistor Q5 via the resistor R15. The fifth transistor Q5 receives the low voltage level driving signal. The fifth transistor Q5 turns on. The fifth transistor Q5 amplifies the base current and outputs a collector current on the collector of the fifth transistor Q5. The collector of the fifth transistor Q5 outputs a third DC voltage to the fan 300. The fan 300 rotates in the corresponding rotational speed, and dissipates heat for the power supply unit 310.

In the working process, resistances of the first variable resistor VR1 and the second variable resistor VR2 are adjusted to change a control proportion of the current detecting circuit 100 and the temperature detecting circuit 200 respectively. When a resistance of the first variable resistor VR1 is increased, the control proportion of the current detecting circuit 100 on the third DC voltage is increased. When a resistance of the second variable resistor VR2 is increased, the control proportion of the temperature detecting circuit 200 on the third DC voltage is increased.

The embodiments shown and described above are only examples. Many details are often found in the art such as the other features of a fan rotational speed adjusting system. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A fan rotational speed adjusting system, the adjusting system comprising:
    a power supply unit and a fan;
    a current detecting circuit configured to detect a first DC voltage from the power supply unit, compare the first DC voltage with a first reference voltage, and output a first adjusting voltage; and
    a temperature detecting circuit configured to detect a temperature change of the power supply unit, and output a second adjusting voltage,
    wherein, the temperature detecting circuit is configured to receive the first adjusting voltage, compare the first adjusting voltage and the second adjusting voltage with a second reference voltage, and output a third DC voltage to the fan; and
    wherein, the fan rotates in the corresponding rotational speed, and dissipates heat for the power supply unit.

2. The fan rotational speed adjusting system of claim 1, wherein the current detecting circuit comprises a first transistor, a second transistor, a third transistor, and a first comparator; the first comparator comprises a non-inverting input terminal, an inverting input terminal, and an output terminal; the first transistor, the second transistor, and the third transistor generate the first reference voltage on the non-inverting input terminal of the first comparator; the inverting input terminal of the first comparator is configured to detect the first DC voltage; and the output terminal of the first comparator is configured to output a control signal.

3. The fan rotational speed adjusting system of claim 2, wherein the power supply unit is configured to provide the first DC voltage to an electronic device; the current detecting circuit further comprises a first resistor, a second resistor, and a third resistor; the second resistor is electrically coupled to the power supply unit and the electronic device in series; a base of the first transistor is electrically coupled to an emitter of the first transistor via the resistor; the emitter of the first transistor is configured to receive a second DC voltage; a collector of the first transistor is electrically coupled to a base of the second transistor and a base of the third transistor; the base of the second transistor is electrically coupled to a collector of the second transistor; an emitter of the second transistor and an emitter of the third transistor are grounded; and a collector of the third transistor is electrically coupled to a connecting point between the power supply unit and the second resistor via the third resistor.

4. The fan rotational speed adjusting system of claim 3, wherein the current detecting circuit further comprises a fourth transistor and a first variable resistor; the first variable resistor comprises a first terminal, a second terminal, and an adjusting terminal; the non-inverting input terminal of the first comparator is electrically coupled to the collector of the third transistor; the inverting input terminal of the first comparator is electrically coupled to a connecting point between the second resistor and the electronic device; the output terminal of the first comparator is electrically coupled to a base of the fourth transistor; a collector of the fourth transistor is configured to receive the second DC voltage; the collector of the fourth transistor is electrically coupled to the first terminal of the first variable resistor; the second terminal and the adjusting terminal of the first variable resistor are grounded; and an emitter of the fourth transistor is grounded.

5. The fan rotational speed adjusting system of claim 4, wherein the first transistor is a PNP type transistor; and the second transistor, the third transistor, and the fourth transistor are NPN type transistors.

6. The fan rotational speed adjusting system of claim 4, wherein the temperature detecting circuit comprises a second comparator, a fifth transistor, a second variable resistor, and a thermal resistor; the second comparator comprises a non-inverting input terminal, an inverting input terminal, and an output terminal; the second variable resistor comprises a first terminal, a second terminal, and an adjusting terminal; the fan comprises an anode and a cathode; the non-inverting input terminal of the second comparator is electrically coupled to the first terminal of the first variable resistor; the non-inverting input terminal of the second comparator is configured to receive the second DC voltage; the non-inverting input terminal of the second comparator is electrically coupled to the first terminal of the second variable resistor; the second terminal and the adjusting terminal of the second variable resistor are electrically connected and grounded via the thermal resistor; the inverting input terminal of the second comparator is configured to receive the second DC voltage; the output terminal of the second comparator is electrically coupled to a base of the fifth transistor; an emitter of the fifth transistor is configured to receive the second DC voltage; a collector of the fifth transistor is electrically coupled to the anode of the fan; and the cathode of the fan is grounded.

7. The fan rotational speed adjusting system of claim 6, wherein the fifth transistor is a PNP type transistor; and the thermal resistor is a Negative Temperature Coefficient thermal resistor.

8. The fan rotational speed adjusting system of claim 6, wherein resistances of the first variable resistor and the second variable resistor are adjusted to change a control proportion of the current detecting circuit and the temperature detecting circuit respectively.

9. The fan rotational speed adjusting system of claim 8, wherein when a resistance of the first variable resistor is increased, the control proportion of the current detecting circuit on the third DC voltage is increased; and when a resistance of the second variable resistor is increased, the control proportion of the temperature detecting circuit on the third DC voltage is increased.

10. A fan rotational speed adjusting system, the adjusting system comprising:
a power supply unit and a fan;
a current detecting circuit configured to detect a first DC voltage from the power supply unit, compare the first DC voltage with a first reference voltage, and output a first adjusting voltage; and
a temperature detecting circuit configured to detect a temperature change of the power supply unit, and output a second adjusting voltage,
wherein, the current detecting circuit comprises a first variable resistor; the temperature detecting circuit comprises a second variable resistor; the temperature detecting circuit is configured to receive the first adjusting voltage, compare the first adjusting voltage and the second adjusting voltage with a second reference voltage, and output a third DC voltage to the fan;
wherein, the fan rotates in the corresponding rotational speed, and dissipates heat for the power supply unit;
wherein, resistances of the first variable resistor and the second variable resistor are adjusted to change a control proportion of the current detecting circuit and the temperature detecting circuit respectively; and
wherein, when a resistance of the first variable resistor is increased, the control proportion of the current detecting circuit on the third DC voltage is increased; and when a resistance of the second variable resistor is increased, the control proportion of the temperature detecting circuit on the third DC voltage is increased.

11. The fan rotational speed adjusting system of claim 10, wherein the current detecting circuit comprises a first transistor, a second transistor, a third transistor, and a first comparator; the first comparator comprises a non-inverting input terminal, an inverting input terminal, and an output terminal; the first transistor, the second transistor, and the third transistor generate the first reference voltage on the non-inverting input terminal of the first comparator; the inverting input terminal of the first comparator is configured to detect the first DC voltage; and the output terminal of the first comparator is configured to output a control signal.

12. The fan rotational speed adjusting system of claim 11, wherein the power supply unit is configured to provide the first DC voltage to an electronic device; the current detecting circuit further comprises a first resistor, a second resistor, and a third resistor; the second resistor is electrically coupled to the power supply unit and the electronic device in series; a base of the first transistor is electrically coupled to an emitter of the first transistor via the resistor; the emitter of the first transistor is configured to receive a second DC voltage; a collector of the first transistor is electrically coupled to a base of the second transistor and a base of the third transistor; the base of the second transistor is electrically coupled to a collector of the second transistor; an emitter of the second transistor and an emitter of the third transistor are grounded; and a collector of the third transistor is electrically coupled to a connecting point between the power supply unit and the second resistor via the third resistor.

13. The fan rotational speed adjusting system of claim 12, wherein the current detecting circuit further comprises a fourth transistor; the first variable resistor comprises a first terminal, a second terminal, and an adjusting terminal; the non-inverting input terminal of the first comparator is electrically coupled to the collector of the third transistor; the inverting input terminal of the first comparator is electrically coupled to a connecting point between the second resistor and the electronic device; the output terminal of the first comparator is electrically coupled to a base of the fourth transistor; a collector of the fourth transistor is configured to receive the second DC voltage; the collector of the fourth transistor is electrically coupled to the first terminal of the first variable resistor; the second terminal and the adjusting terminal of the first variable resistor are grounded; and an emitter of the fourth transistor is grounded.

14. The fan rotational speed adjusting system of claim 13, wherein the first transistor is a PNP type transistor; and the second transistor, the third transistor, and the fourth transistor are NPN type transistors.

15. The fan rotational speed adjusting system of claim 13, wherein the temperature detecting circuit comprises a second comparator, a fifth transistor, and a thermal resistor; the second comparator comprises a non-inverting input terminal, an inverting input terminal, and an output terminal; the second variable resistor comprises a first terminal, a second terminal, and an adjusting terminal; the fan comprises an anode and a cathode; the non-inverting input terminal of the second comparator is electrically coupled to the first terminal of the first variable resistor; the non-inverting input terminal of the second comparator is configured to receive the second DC voltage; the non-inverting input terminal of the second comparator is electrically coupled to the first terminal of the second variable resistor; the second terminal and the adjusting terminal of the second variable resistor are electrically connected and grounded via the thermal resistor; the inverting input terminal of the second comparator is configured to receive the second DC voltage; the output terminal of the second comparator is electrically coupled to a base of the fifth transistor; an emitter of the fifth transistor is configured to receive the second DC voltage; a collector of the fifth transistor is electrically coupled to the anode of the fan; and the cathode of the fan is grounded.

16. The fan rotational speed adjusting system of claim 15, wherein the fifth transistor is a PNP transistor; and the thermal resistor is a Negative Temperature Coefficient thermal resistor.

* * * * *